(12) United States Patent
Post et al.

(10) Patent No.: US 12,682,314 B2
(45) Date of Patent: Jul. 14, 2026

(54) METHOD FOR INBOUND INVENTORY PUTAWAY

(71) Applicant: Dematic Corp., Grand Rapids, MI (US)

(72) Inventors: Timothy C. Post, Grand Rapids, MI (US); Jonathan Mulder, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 520 days.

(21) Appl. No.: 18/059,654

(22) Filed: Nov. 29, 2022

(65) Prior Publication Data

US 2023/0169456 A1 Jun. 1, 2023

Related U.S. Application Data

(60) Provisional application No. 63/284,055, filed on Nov. 30, 2021.

(51) Int. Cl.
G06Q 10/087 (2023.01)

(52) U.S. Cl.
CPC .................................. G06Q 10/087 (2013.01)

(58) Field of Classification Search
CPC .............................. G06Q 10/087; G06Q 10/08
See application file for complete search history.

(56) References Cited

U.S. PATENT DOCUMENTS

| | | | | | |
|---|---|---|---|---|---|
| 7,357,323 | B2 * | 4/2008 | Silverbrook | ....... | G06K 7/10693 235/462.01 |
| 7,653,457 | B2 * | 1/2010 | Bloom | ...................... | G07C 9/23 700/226 |

| | | | | | |
|---|---|---|---|---|---|
| 7,797,204 | B2 * | 9/2010 | Balent | ................ | G06Q 30/0633 705/28 |
| 8,666,848 | B1 * | 3/2014 | Polsky | ................... | G06Q 10/08 705/28 |
| 9,741,007 | B1 * | 8/2017 | Rouaix | ................... | G06Q 10/08 |
| 10,329,089 | B2 * | 6/2019 | Kasper | ................ | B65G 17/485 |
| 11,001,445 | B2 * | 5/2021 | Hoffman | .............. | B65G 1/1375 |

(Continued)

OTHER PUBLICATIONS

International Search Report and Written Opinion from corresponding Patent Cooperation Treaty (PCT) Application No. PCT/IB22/61552, completed Jan. 26, 2023.

(Continued)

*Primary Examiner* — Michael Jared Walker
(74) *Attorney, Agent, or Firm* — Gardner, Linn, Burkhart & Ondersma LLP

(57) ABSTRACT

Methods are provided for optimizing retail inventory receiving and putaway processes within a retail store. The methods include segregating items from inbound inventory loads by unloading and identifying each of the items in the load. Based on the identity of an item, a computer directs the operator to segregate each item to a putwall, such as to a container on a mobile inventory cart. A pick to light (PTL) system is utilized to direct the operator's segregation processes. Each item is segregated into a family or sub-family grouping of inventory items that correspond to a particular department or sub-department of the retail floor of the store. Segregated family or sub-family groupings are distributed to respective departments to be putaway by an associate on the retail floor. The methods may be adapted to process e-commerce orders for shipment out of the store or for in-store customer pickup.

20 Claims, 10 Drawing Sheets

(56)         References Cited

U.S. PATENT DOCUMENTS

| 11,673,746 B2 * | 6/2023 | Parrott ..................... B65G 1/08 |
| | | 700/216 |
| 2003/0158796 A1 * | 8/2003 | Balent ................... G06Q 30/06 |
| | | 705/28 |
| 2004/0206824 A1 * | 10/2004 | Lapstun ............... H04N 3/1568 |
| | | 348/E3.021 |
| 2004/0249497 A1 * | 12/2004 | Saigh ..................... E04H 14/00 |
| | | 700/216 |
| 2007/0187183 A1 * | 8/2007 | Saigh ..................... E04H 14/00 |
| | | 186/53 |
| 2008/0149710 A1 | 6/2008 | Silverbrook et al. |
| 2015/0242918 A1 * | 8/2015 | Mccarthy .......... G06Q 30/0635 |
| | | 705/26.43 |
| 2020/0279217 A1 | 9/2020 | Gravelle et al. |
| 2023/0031912 A1 * | 2/2023 | Dahlenburg ........... G07F 17/12 |

OTHER PUBLICATIONS

European Search Report from corresponding European Patent Application No. 22900767.9 dated Nov. 5, 2025.

* cited by examiner

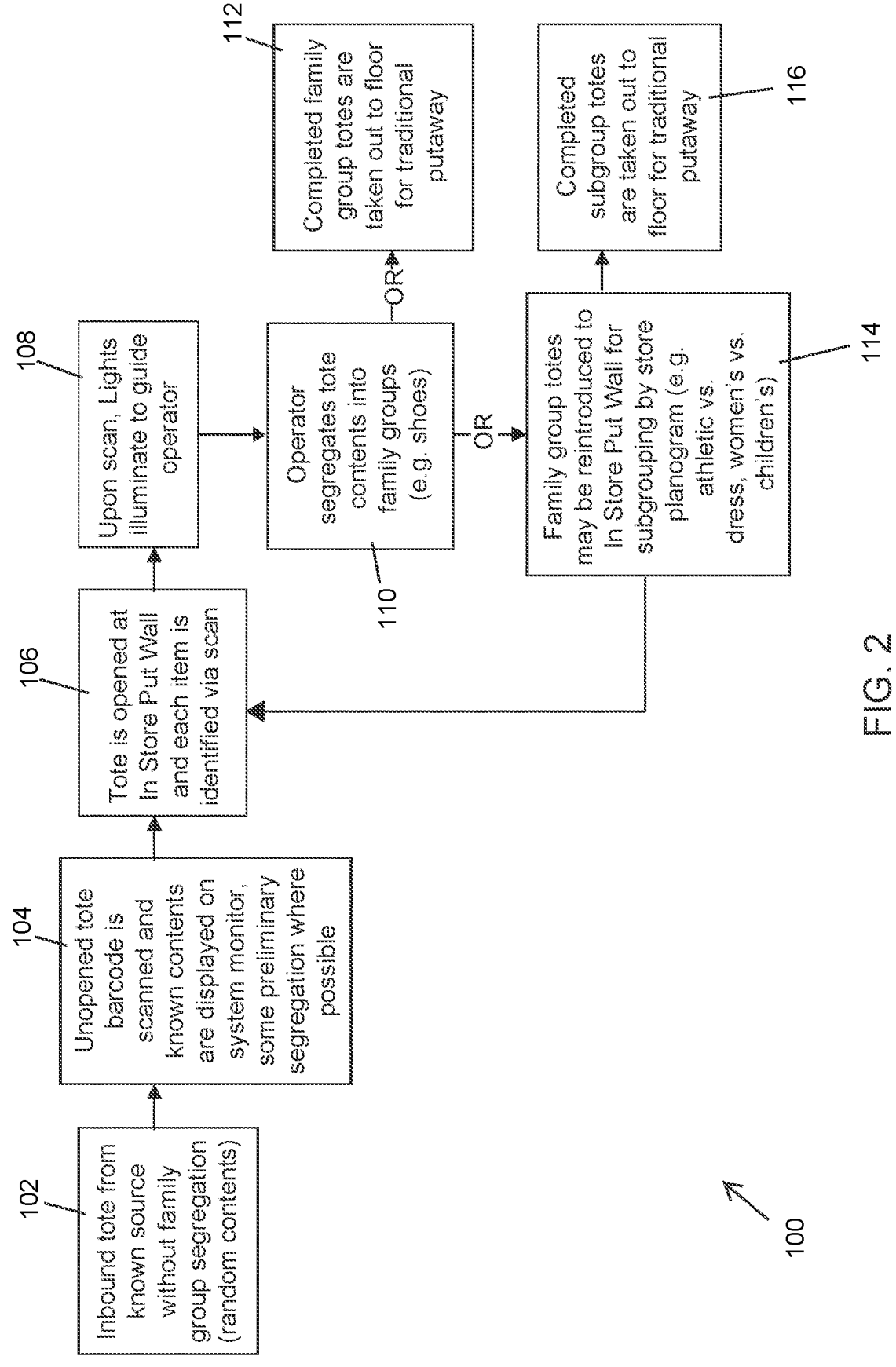

102 — Inbound tote from known source without family group segregation (random contents)

104 — Unopened tote barcode is scanned and known contents are displayed on system monitor, some preliminary segregation where possible 106 — Tote is opened at In Store Put Wall and each item is identified via scan 108 — Upon scan, Lights illuminate to guide operator 110 — Operator segregates tote contents into family groups (e.g. shoes)

OR

112 — Completed family group totes are taken out to floor for traditional putaway

OR

114 — Family group totes may be reintroduced to In Store Put Wall for subgrouping by store planogram (e.g. athletic vs. dress, women's vs. children's)

116 — Completed subgroup totes are taken out to floor for traditional putaway

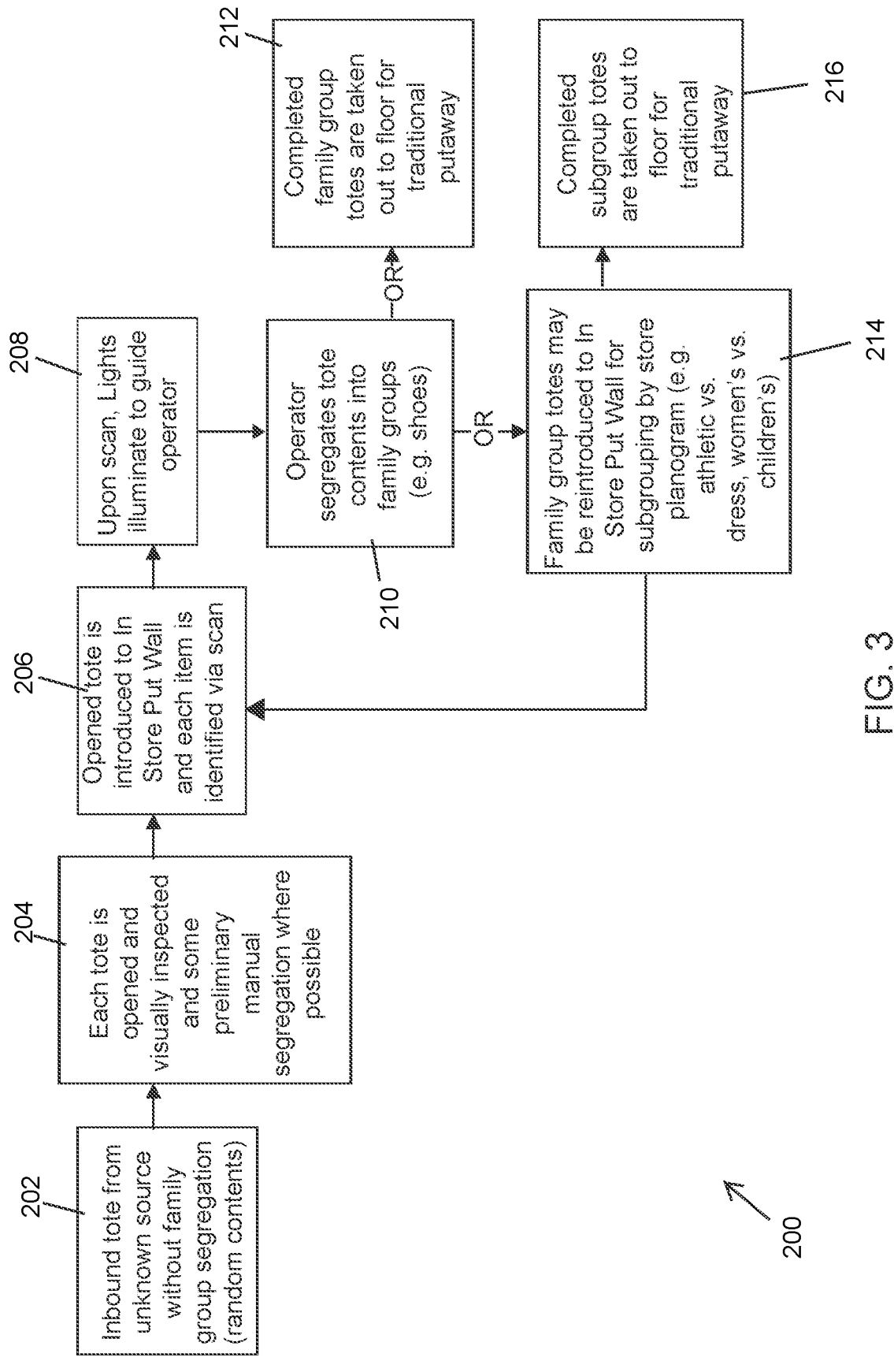

202 — Inbound tote from unknown source without family group segregation (random contents)

204 — Each tote is opened and visually inspected and some preliminary manual segregation where possible 206 — Opened tote is introduced to In Store Put Wall and each item is identified via scan 208 — Upon scan, Lights illuminate to guide operator 210 — Operator segregates tote contents into family groups (e.g. shoes)

OR

212 — Completed family group totes are taken out to floor for traditional putaway 214 — Family group totes may be reintroduced to In Store Put Wall for subgrouping by store pianogram (e.g. athletic vs. dress, women's vs. children's)

OR

216 — Completed subgroup totes are taken out to floor for traditional putaway

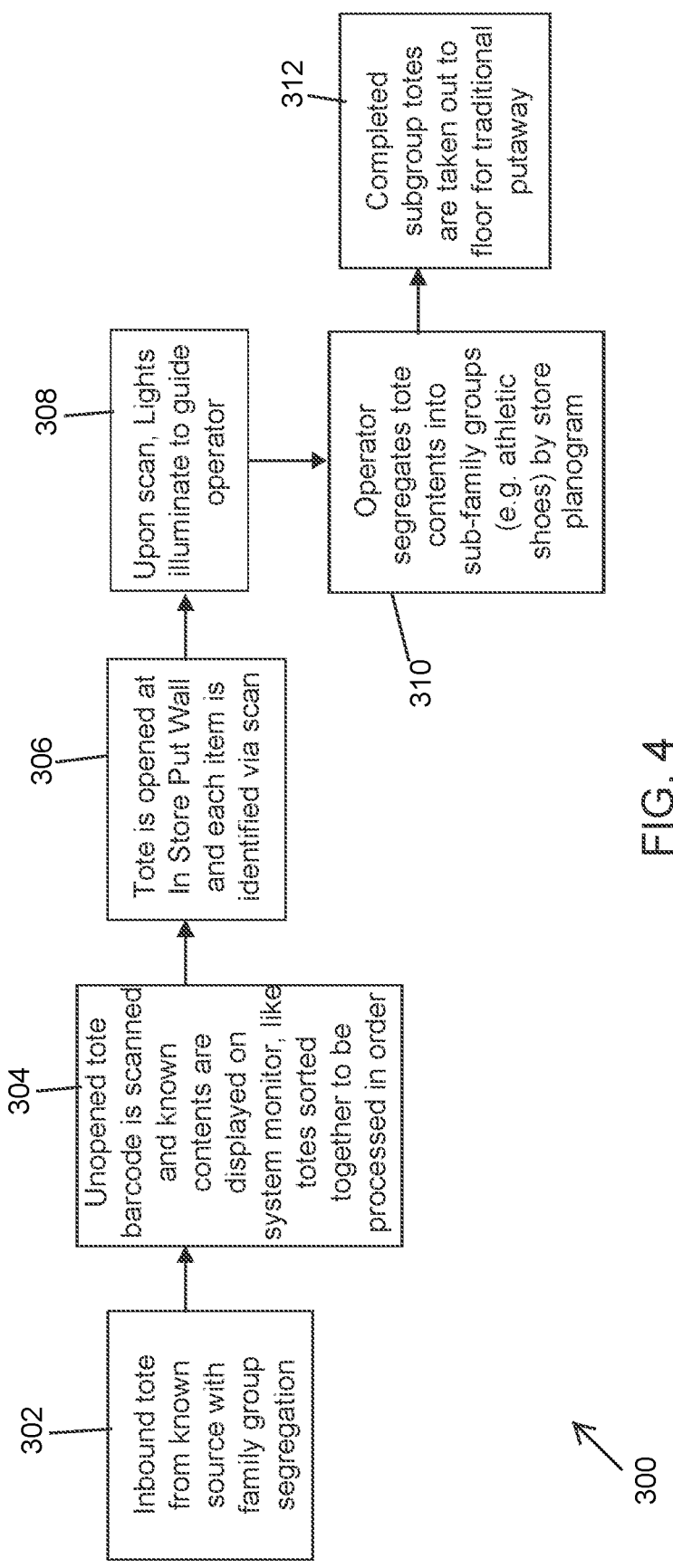

302
Inbound tote from known source with family group segregation

304
Unopened tote barcode is scanned and known contents are displayed on system monitor, like totes sorted together to be processed in order 306
Tote is opened at In Store Put Wall and each item is identified via scan 308
Upon scan, Lights illuminate to guide operator 310
Operator segregates tote contents into sub-family groups (e.g. athletic shoes) by store planogram 312
Completed subgroup totes are taken out to floor for traditional putaway

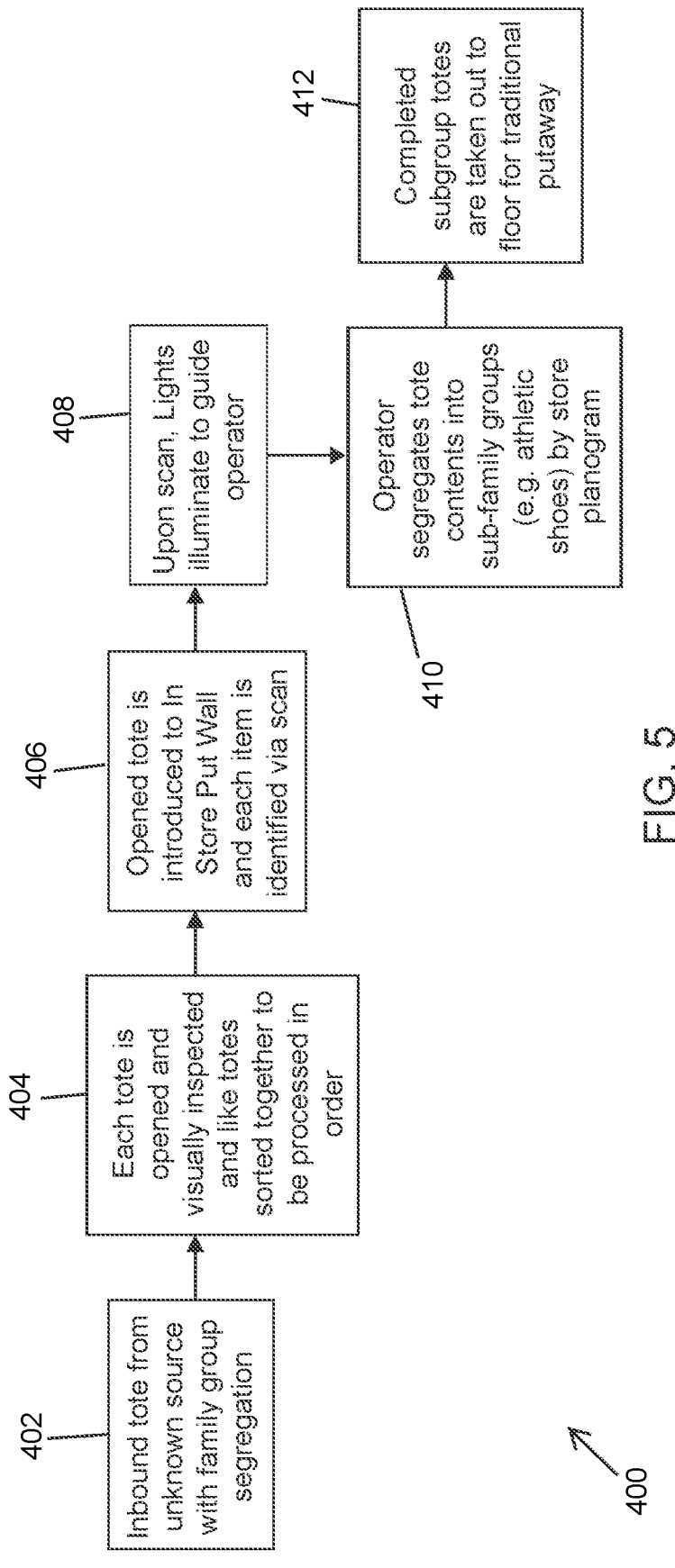

402 — Inbound tote from unknown source with family group segregation

404 — Each tote is opened and visually inspected and like totes sorted together to be processed in order 406 — Opened tote is introduced to In Store Put Wall and each item is identified via scan 408 — Upon scan, Lights illuminate to guide operator 410 — Operator segregates tote contents into sub-family groups (e.g. athletic shoes) by store planogram 412 — Completed subgroup totes are taken out to floor for traditional putaway

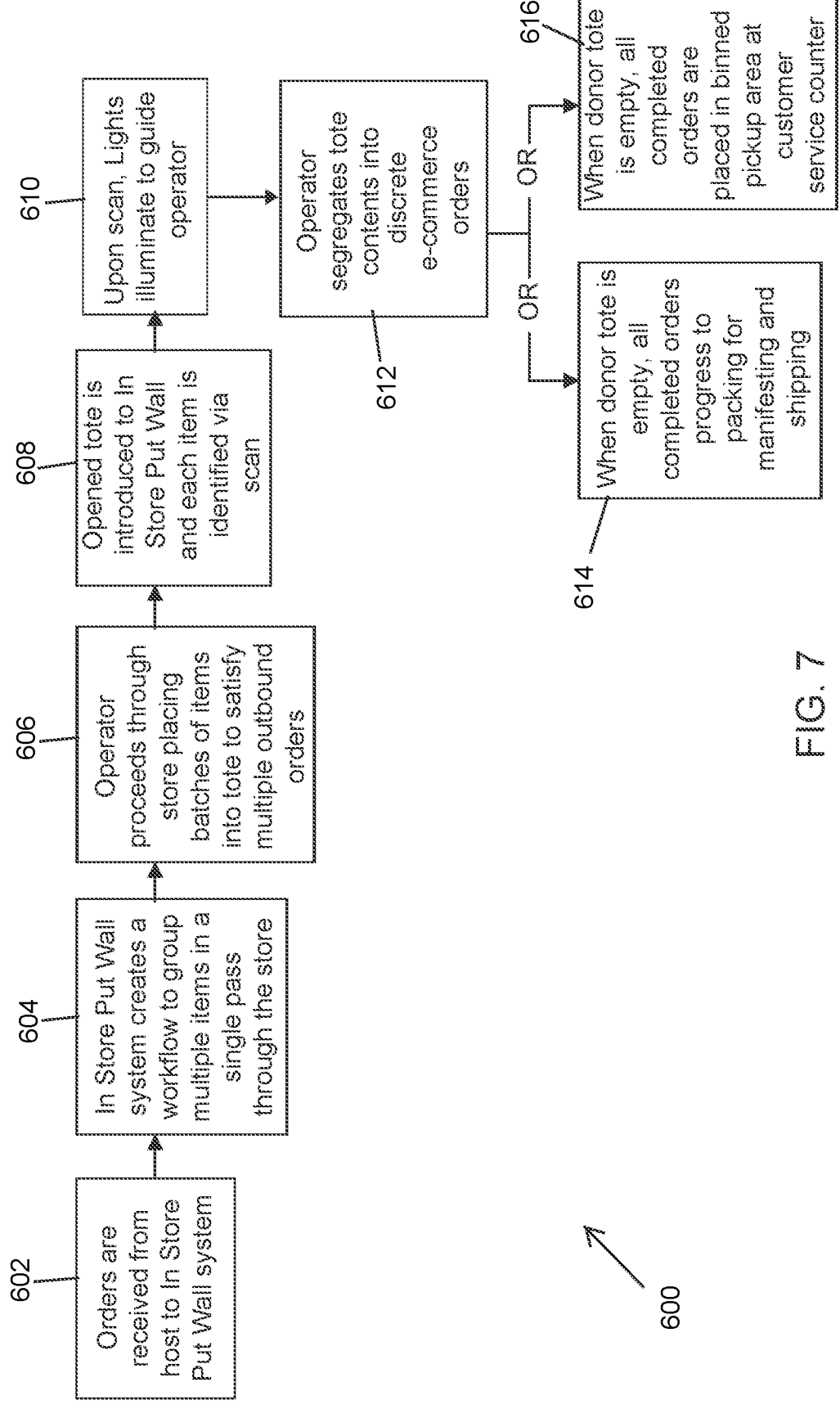

602 — Orders are received from host to In Store Put Wall system

604 — In Store Put Wall system creates a workflow to group multiple items in a single pass through the store 606 — Operator proceeds through store placing batches of items into tote to satisfy multiple outbound orders 608 — Opened tote is introduced to In Store Put Wall and each item is identified via scan 610 — Upon scan, Lights illuminate to guide operator 612 — Operator segregates tote contents into discrete e-commerce orders

OR

616 — When donor tote is empty, all completed orders are placed in binned pickup area at customer service counter

OR

614 — When donor tote is empty, all completed orders progress to packing for manifesting and shipping

METHOD FOR INBOUND INVENTORY PUTAWAY

CROSS REFERENCE TO RELATED APPLICATION

The present application claims priority of U.S. provisional application Ser. No. 63/284,055 filed Nov. 30, 2021, which is hereby incorporated by reference herein in its entirety.

FIELD OF THE INVENTION

The present invention is directed to material handling, and in particular to inventory management within a retail facility.

BACKGROUND OF THE INVENTION

It is no secret that retail stores must constantly restock depleted shelves and product displays as customers buy up goods. A major cost and consideration for retailers is the labor required to process the never-ending stream of inbound inventory replenishments within their retail facilities. As digital shopping and e-commerce continue to grow, due in part to the nature of the COVID-19 pandemic, inbound inventory entering retail facilities is increasingly delivered in the form of "broken case" inbound containers (i.e. vendor cases with disparate or dissimilar items or goods). The in-store receiving process is commonly "blind" in that the associates receiving the goods and unboxing the goods from inbound containers are unaware of what goods are in a particular container. The associate may be apprised of all the goods expected in an entire inbound delivery, but is often blind as to what items may be contained in a particular container of the delivery. Commonly, hundreds of containers arrive at a retail facility in a given day and each container lacks any indication as to their contents. Accordingly, each container must be opened, sorted, placed on a cart, and brought to the sales floor where they are visually sorted to locations for re-stock or display. This is process is typically time intensive and may be prone to error or inefficiency, such as in the form of inventory shrink.

The landscape of the retail industry is ever evolving and has recently forced some retailers to close up to fifty percent or more of their brick and mortar stores. Closures of brick and mortar retail stores have been offset to some degree by rapid growth in e-commerce operations. In some warehouse or distribution center to retail store floor distribution models, stock keeping unit (SKU) pure donor containers (i.e. SKU commonality or containers with one particular type of item) are commonly supplied to retail facilities. SKU commonality across consistent store locations may enable high throughput efficiency for distribution centers supplying to retail facilities with inventory replenishment. However, as a result of store closers (i.e. fewer store locations) and lower store traffic may contribute to lower SKU commonality of orders being prepared for a retail store or multiple retail stores with similar inventory requirements, which may render a distribution center's material handling equipment (MHE) oversized with underutilized capacity, thereby causing a significant decrease in fulfillment efficiency. In other words, with decreased retail store inventory turnover and decreased demand it may be difficult to efficiently fill containers with merchandise in a SKU pure manner prior to delivery to the retail store.

In distribution centers configured for large volume distribution to replenish retail store inventory, performing other types of order fulfilment may underutilize the capacity of the distribution center. For example, small e-commerce orders of ten or less items or "eaches" may require only a fraction of the volume of a receptacle or tote, and thus large receptacles in the facility may be oversized, which may degrade MHE throughput.

SUMMARY OF THE INVENTION

The present invention provides methods for receiving, segregating, and efficiently distributing inbound inventory items within a retail facility or store. The methods may be adapted to fulfil e-commerce orders from inventory present within the store. The methods are particularly well suited for processing inbound inventory containers that are broken cases, or cases with inventory items that are not optimized or strictly categorized into family or sub-family groupings of item types. The methods utilize warehouse or inventory management systems, putwalls, such as in the form of mobile pick carts, and pick-to-light systems (PTL), which may include multi-color and alphanumeric display systems. The methods leverage data from source warehouses that compile and deliver inbound inventory to retail stores. For instance, source warehouses may track each item that is packed into a particular container using an automated warehouse management system and the packing information may be saved in a database. The database information may then be shared with the retail store such that the retail store may know the contents of each package or container received in a delivery prior to opening the container. With advanced knowledge of what items are present in a particular inbound container, it is possible for associates in the receiving portion of the store to sort or segregate boxes at the back of the store (i.e. non-retail portion of the store). As such, inbound containers may be prioritized based on various different criteria, such as what inbound items are desired for inventory replenishment first. For example, a store associate may select an inbound container known to contain items in a particular family grouping of which the associate is currently prepping to send to the retail floor and other unwanted or unneeded inbound containers may be passed over or set aside until the retail facility requires them.

The inbound items are sorted and segregated in an optimal manner with like goods (e.g. goods belonging to a particular department or sub-department) being grouped with other like goods to form family groupings or even sub-family groupings. Thus, once a family or sub-family grouping is distributed to the retail floor, the associate in charge of restocking the shelves must only cover as much ground to do so as is optimally determined by the inventory management system. The associate should not be required to cross large portions of the store to place all of their assigned items onto the correct shelves. On the contrary, the putaway associate should be able to remain within a relatively small zone or local region of the retail store while unloading and restocking all their assigned items from a particular family grouping.

The methods may decrease truck to floor times for retail stores. The methods may facilitate auditing of inbound cases and thus reduce or prevent inventory errors or shrink. Additional advantages and benefits of the methods may include metric tracking of in-store process such as monitoring associate inventory putaway times, reduction in training or on-boarding time and/or difficulty for new employees, the ability to utilize part-time, temporary, or seasonal workers whom may be unfamiliar with a particular retail facilities inventory system and processes.

In some aspects of the present invention, methods may enable conventional put to store module or distribution models to be reconfigured to process small volume e-commerce type orders, either independently or simultaneously with retail inventory replenishment order fulfilment processes. Thus enabling conventional retail store inventory replenishment distribution centers to accommodate e-commerce orders and shipments. The software and or control systems of the distribution center may be modified to accommodate changes in product conveyance and routing which may lead to optimized efficiency of the distribution center while performing both retail store inventory replenishment processes e-commerce order fulfilment processes. As such, donor totes (i.e. warehouse storage containers) or vendor cases may not be SKU pure, but contain a batch of items to complete a subset of e-commerce orders within the distribution center.

Larger totes may be modified or configured with dividers to define individual compartments within the tote, enabling multiple orders per tote (MOPT). Providing sub-divided containers may optimize volume usage of the totes when they are utilized for e-commerce order processes. In other words, each compartment may receive two to six items for a particular order, wherein the overall tote may contain six or eight compartments, each holding two to six items, for example. Optimization of tote volume usage may decrease tote traffic within the MHE. Put-to-light devices may be utilized along with sub-divided totes to facilitate picker efficiencies when handling smaller orders, which may both increase retail store inventory putaway efficiency and facilitate e-commerce orders.

According to one form of the present invention, a method is provided for receiving and segregating received inventory items, and distributing the inventory items to a customer accessible retail floor of a retail facility. The method includes receiving, in a non-retail portion of the retail facility, a load of inventory items from a warehouse facility (such as from a transport/delivery vehicle). The contents of the load of inventory items are known from the warehouse facility and are stored in a database that is accessible at each of the warehouse facility and the retail facility. The method includes assessing the contents of the received load. For each inventory item in the received load, the method includes identifying a particular inventory item, which includes an operator scanning an identifier on the particular item, and correlating, with a retail computer, the scanned identifier with the database. The operator segregates (based on instruction from the retail computer) the particular item to a corresponding portion of a put wall located in the non-retail portion of the retail facility. The corresponding portion of the put wall contains a segregated item grouping defined by a particular retail family type of items (e.g. menswear). The method includes distributing the segregated item grouping to a corresponding portion of the customer accessible retail floor of the retail facility (e.g. the menswear section of the store).

In one aspect, the received load of inventory items includes or is made up of at least one inventory item profile chosen from (i) inventory items sourced from a known warehouse facility and having a non-segregated composition of inventory items that is not categorized by retail family type, (ii) inventory items sourced from a known warehouse facility and having a segregated composition of inventory items that is categorized by one or more item groupings of retail family types, (iii) inventory items sourced from an unknown warehouse facility and having a non-segregated composition of inventory items that is not categorized by retail family type, or (iv) inventory items sourced from a known warehouse facility and having a segregated composition of inventory items that is categorized by one or more item groupings of retail family types.

In another aspect, segregating the inventory items includes segregating the inventory items into item subgroupings defined by a subset of a particular retail family type (e.g. ties, cufflinks, and belts as a subset of menswear).

In yet another aspect, the put wall is formed of a mobile inventory cart and distributing the segregated item grouping to the retail floor includes transporting the segregated item grouping to the retail floor on the mobile inventory cart.

In still another aspect, the put wall includes a pick to light system in communication with the retail computer, and the retail computer is configured for controlling the pick to light system for guiding the operator to place inventory items at appropriate locations on the put wall.

In yet still another aspect, the method may include preparing retail inventory replenishment orders and individual customer e-commerce orders simultaneously within a unit sortation system of a warehouse facility having a warehouse computer. Preparing such orders includes receiving, at the warehouse facility, a plurality of retail inventory replenishment orders from at least one retail facility and a plurality of e-commerce orders from at least one individual e-commerce customer. The warehouse computer controls the unit sortation system to transport items from an upstream storage system to a warehouse workstation of the unit sortation system, such as on a conveyor of the unit sortation system, for example. An operator at the warehouse workstation picks items from the conveyor and places them to one or more of (i) a retail order container for retail inventory replenishment orders or (ii) an e-commerce order container configured to contain and support one or more e-commerce order. The method includes transporting completed retail order containers as inventory loads to the non-retail portion of the retail facility and transporting completed e-commerce order containers to a downstream e-commerce handling system for further processing.

In another aspect still, the warehouse workstation includes a pick to light system in communication with the warehouse computer and configured to guide the operator at the unit sortation system workstation to place inventory items at appropriate ones of retail order containers and e-commerce order containers supported at the warehouse workstation.

According to another form of the present invention, a method is provided for preparing retail inventory replenishment orders and individual customer e-commerce orders simultaneously in a warehouse facility. The method includes receiving and segregating received inventory items at a retail facility, and distributing the inventory items to a customer accessible retail floor of the retail facility. The method includes receiving, at warehouse computer of the warehouse facility, one or more retail inventory replenishment orders from at least one retail facility and a plurality of e-commerce orders from at least one individual e-commerce customer. The warehouse computer controls a unit sortation system to transport warehouse items on a conveyor (e.g. a roller conveyor, belt conveyor, a human transporting the items, or a robot transporting the items) from an upstream storage system to a warehouse workstation of the unit sortation system. Picking warehouse items from the conveyor and placing them to either of a retail order container for retail inventory replenishment orders and/or an e-commerce order container configured to contain and support one or more e-commerce order. The method includes transporting completed retail order containers as inventory loads from the warehouse facility to a non-retail portion of the retail facility. The method also includes transporting completed e-commerce order containers to a downstream e-commerce handling system (e.g. an e-commerce handling platform or a packing station) for further processing. Receiving, in the non-retail portion of the retail facility, a received load of inventory items from the warehouse facility, in which the contents of the load of inventory items are known from the warehouse facility and are stored in a database that is accessible at each of the warehouse facility and the retail facility. A retail operator at the retail facility segregates the inventory items from the received load to a put wall. The inventory items are segregated and categorized into item groupings defined by a particular retail family type (e.g. home goods), and the segregated and categorized into item groupings are distributed to correlating portions of the customer accessible retail floor of the retail facility.

In one aspect, the method includes scanning an identifier on the received load with a scanning device and then retrieving or accessing, with a retail computer at the retail facility, the contents of the received load from the database based on the scanned identifier. The contents of the received load are communicated to the retail operator to guide the operator in segregating inventory items.

In another aspect, the put wall includes a pick to light system in communication with the retail computer and provided to guide the retail operator to place inventory items at appropriate locations on the put wall.

In yet another aspect, the load of inventory items may be made up of at least one inventory item profile chosen from (i) inventory items sourced from a known warehouse and having a non-segregated composition of inventory items that is not categorized by retail family type, (ii) inventory items sourced from a known warehouse and having a segregated composition of inventory items that is categorized by retail family type, (iii) inventory items sourced from an unknown warehouse and having a non-segregated composition of inventory items that is not categorized by retail family type, (iv) inventory items sourced from a known warehouse and having a segregated composition of inventory items that is categorized by retail family type.

In still another aspect, segregating the inventory items includes segregating the inventory items into item subgroupings defined by a subset of a particular retail family type (e.g. towels and blankets are a subset of home goods).

In yet still another aspect, the put wall is formed in part by a mobile inventory cart and the distributing the segregated item groupings includes transporting the segregated item groupings to the retail floor on the mobile inventory cart.

In another aspect still, the warehouse workstation includes a pick to light system in communication with the warehouse computer and provided to guide the operator at the warehouse workstation to place inventory items at appropriate ones of retail order containers and e-commerce order containers supported at the warehouse workstation.

According to another form of the present invention, a method is provided for order fulfillment in a retail facility, the method including receiving customer orders at an order fulfillment system within a retail facility, the order fulfilment system having a retail computer and a put wall located in a non-retail portion of the retail facility. The method includes selecting multiple customer orders from a pending order list and determining an optimal picking path to items required for the selected orders. Some, or all, of the items required for the selected orders are located within a customer accessible portion of the retail facility. An operator follows the optimal picking path and retrieves the required items from the customer accessible portion of the retail facility and then transports the retrieved items to the non-retail portion of the retail facility. For each item retrieved, the method includes an operator scanning an identifier on a particular retrieved item, and the operator then segregating, based on instruction from the retail computer, the particular item to a corresponding one of a plurality of order containers at the put wall. Once all items retrieved are segregated into a corresponding one of the plurality of order containers, the method includes distributing the order containers to respective customers.

In one aspect, distributing the order containers is performed by either of (i) shipping the order containers from the retail facility to the respective customers and/or (ii) presenting the order containers at a customer pickup portion of the retail facility for customers to retrieve.

In another aspect, the put wall includes a pick to light system in communication with the retail computer and configured to guide the operator to place inventory items at appropriate locations on the put wall.

In yet another aspect, at least some of the items required for the selected orders are located within the non-retail portion of the retail facility and the method includes the operator retrieving those required items from the non-retail portion of the retail facility.

In still another aspect, the method includes replenishing inventory items in the retail facility, which includes receiving, in a non-retail portion of the retail facility, a load of inventory items from a warehouse facility. The contents of the load of inventory items are known from the warehouse facility and are stored in a database that is accessible at each of the warehouse facility and the retail facility. The method includes assessing the contents of the received load, and for each inventory item in the received load, the assessment includes an operator retrieving a particular inventory item from the received load. The operator may scan an identifier on the particular item, and the retail computer correlates the scanned identifier with the database. The method includes the operator segregating, based on instruction from the retail computer, the particular item to a corresponding portion of a put wall located in the non-retail portion of the retail facility. The corresponding portion of the put wall containing a segregated item grouping defined by a particular retail family type of items (e.g. children's good). The segregated item grouping is then distributed to a corresponding portion of the customer accessible portion of the retail facility (e.g. the children's section).

As disclosed above, the methods are adaptable to perform e-commerce fulfilment within a store utilizing inventory present in the store, such as for in-store pickup or for shipping out of the store. Alternatively, the e-commerce fulfillment may be utilized for customer in-store pickup in which customers order online and choose to pick up in store and in which the items are shipped from a remote warehouse to the store upon the customer placing the order. The customer is then alerted when their order is ready at the store (in other words back of house e-commerce/last mile). Such e-commerce includes breaking down orders that are shipped to a store in a large batch container holding multiple orders and then segregating the individual orders and presenting the orders to the customer in the retail store.

These and other objects, advantages, purposes and features of this invention will become apparent upon review of the following specification in conjunction with the drawings.

BRIEF DESCRIPTION OF THE DRAWINGS

FIG. 2 is a diagram of a method for inventory putaway within a retail facility, in accordance with the present invention;

FIG. 3 is a diagram of another method for inventory putaway within a retail facility, in accordance with the present invention;

FIG. 4 is a diagram of another method for inventory putaway within a retail facility, in accordance with the present invention;

FIG. 5 is a diagram of another method for inventory putaway within a retail facility, in accordance with the present invention;

FIG. 7 is a diagram of another method for inventory putaway within a retail facility, in accordance with the present invention;

DESCRIPTION OF THE PREFERRED EMBODIMENTS

Figure 1:
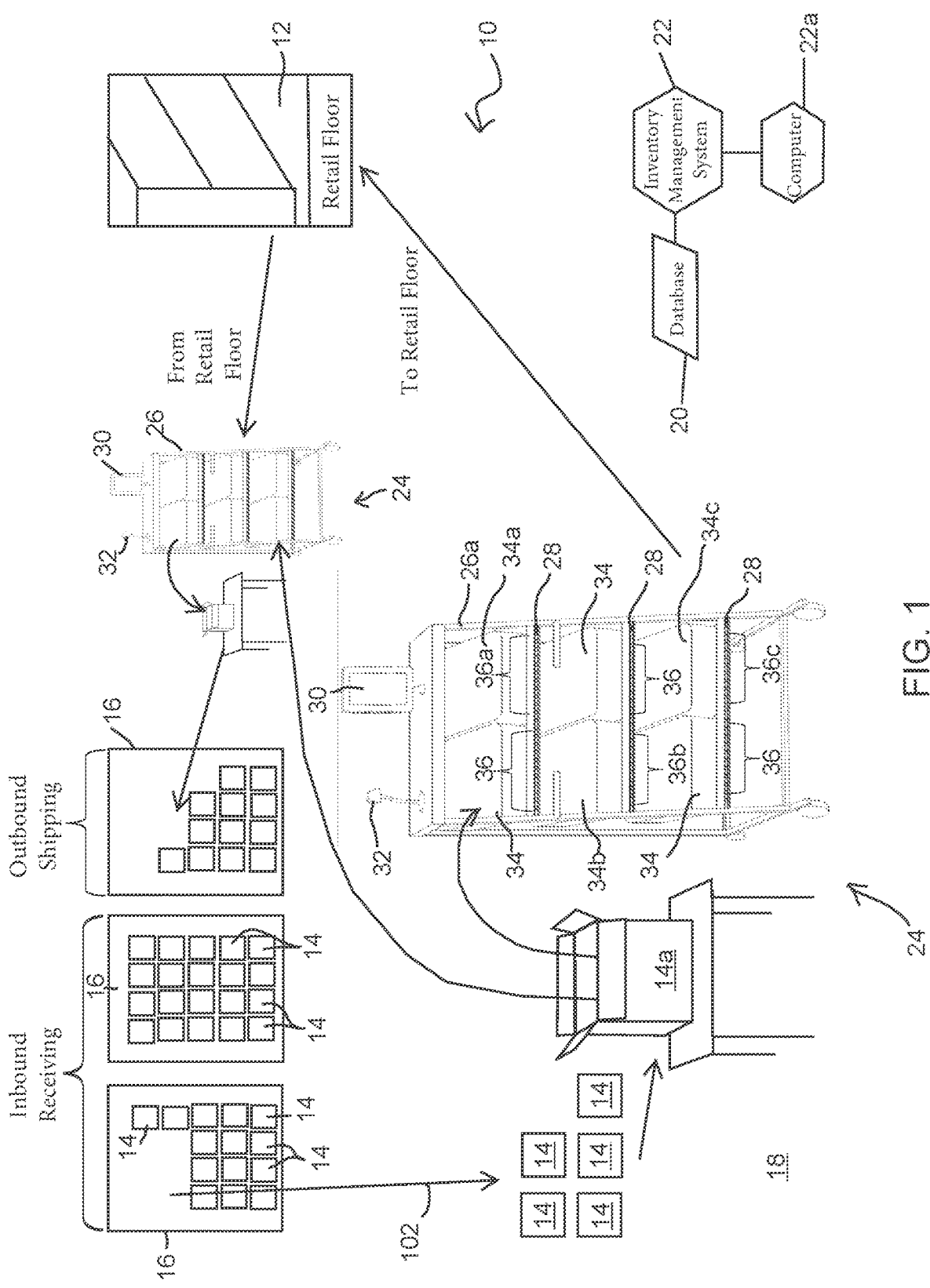
FIG. 1 is a diagrammatic view of a retail facility, including an inventory item segregation system, in accordance with the present invention.

Referring now to the drawings and the illustrative embodiments depicted therein, methods are provided for electronically aiding in receiving and auditing of inbound or received inventory loads, (e.g. cartons, cases, boxes, containers, totes, etc.), and separation or segregation of retail inventory items into family or sub-family groups for optimal store putaway for retail facilities (e.g. shelf restocking). The methods include directing an operator or store associate during each of the receiving, sorting, and restocking processes of the inventory replenishment aspects of operating a retail store. The method is particularly beneficial for "broken cases" of inventory items which are often a combination of random, assorted, non-homogenous, partially sorted, and otherwise non-segregated items that are not optimized for distribution to the retail floor for putaway, such as based on a store's planogram. The method provides electronically aided inventory management and guidance, which may improve operator accuracy and facilitate auditing of product in a received load. The method may utilize mobile putwall carts to reduce physical labor requirements and/or pick/put-to-light (PTL) guidance systems to guide operator segregation and putaway operations. The PTL systems may include multi-color indicators as well as alphanumeric displays, for example. The method and components for use with the method may be adapted for use in e-commerce in which a customer places an order online based on inventory on-hand at the retail store and the customer then picks up their order at the retail store or the retail store ships the order directly to the customer.

The methods may decrease truck to floor times for retail stores. In other words, the method may improve on the time that it typically takes for inventory to be unloaded from a delivery vehicle to the time that it is placed on a store shelf or display for customer selection. The methods facilitate auditing of inbound cases and may reduce or prevent inventory errors or shrink (i.e. having fewer items in physical inventory compared to the number in the inventory log or database). Additional advantages of the methods may include metric tracking of in-store process (e.g. monitoring associate inventory putaway times), reduction in training or on-boarding time and/or difficulty for new employees, the ability to utilize part-time, temporary, or seasonal workers that may be unfamiliar with a particular retail facilities inventory system and processes. While it would be optimal to provide a retail store's planogram to the warehouse facility prior to picking and shipping the goods to the retail store, it will be appreciated that this is often times not feasible as store floor plans and shelf planograms may fluctuate often, such as daily or weekly. Additionally, a single warehouse facility may service a multitude of retail stores, such that integrating store planogram information may be impractical. Thus, the methods described herein are directed to optimizing inventory receiving and putaway when inbound product or cases are less-than optimized for putaway in the subject retail facility.

Some of the methods illustrated herein may be particularly well suited for segregating broken cases of received product into family groups or sub-family groups. Family groups in retail stores include items or products commonly displayed together within the customer accessible portion of the store. Family groups may include specific departments, sections, or portions of a retail store, such as shoes, menswear, children's apparel, housewares and home goods, etc. Sub-family groups add an additional level of granularity to each family group. Sub-family groups are defined by a subset of items or products that fall within a family group. For example, the menswear family group may include sub-families such as men's athletic apparel, men's dress wear, men's casual wear, and the like. However, as described in the various illustrative embodiments below, the methods may be utilized for order-fulfillment processes in addition or alternative to retail inventory receiving, segregation, and putaway.

Figure 8:
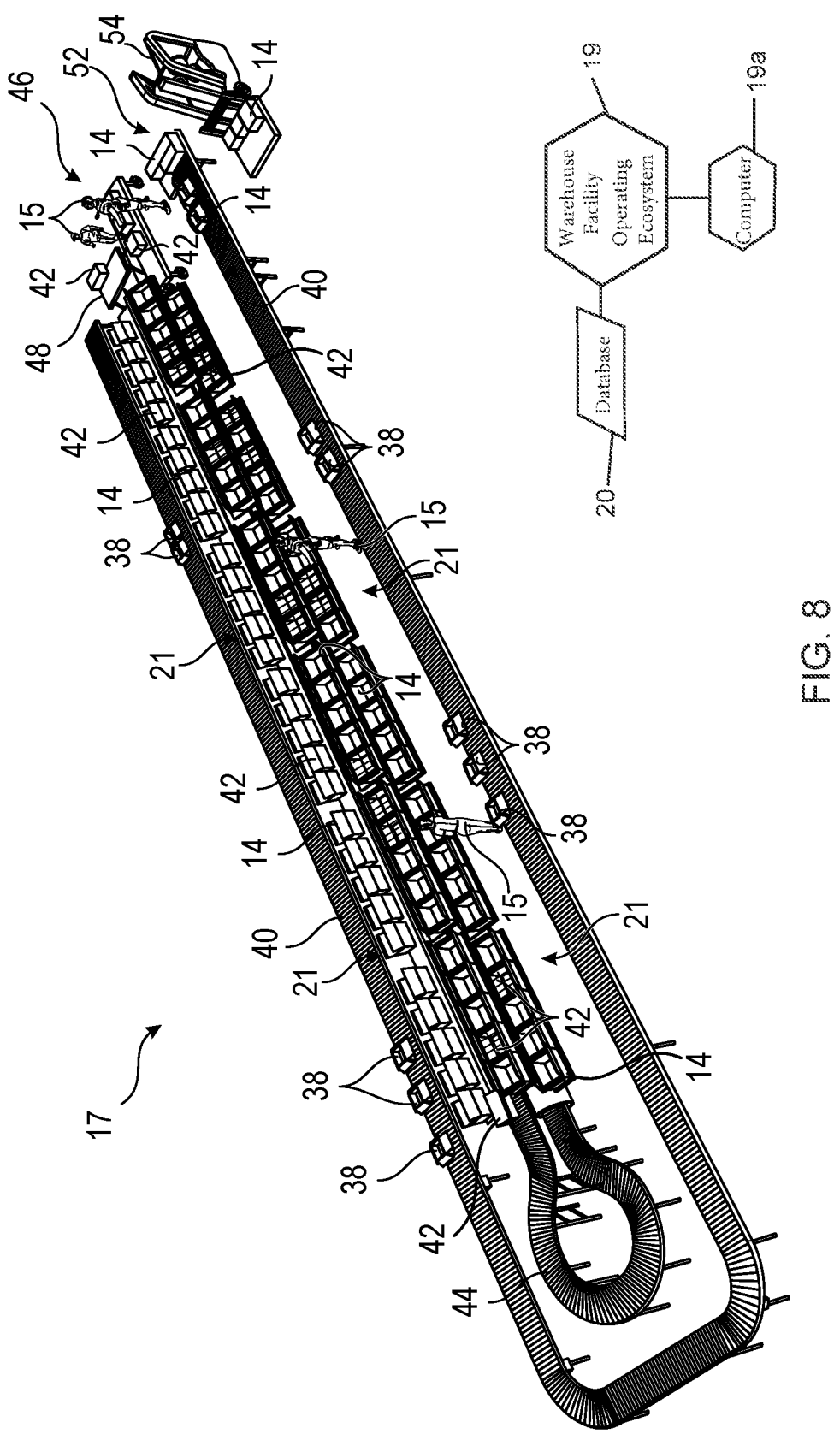
FIG. 8 is a perspective view of a material handling system having a plurality of order fulfilment workstations for preparing retail orders and e-commerce orders, in accordance with an aspect of the present invention.

Referring to the illustrative embodiment of FIGS. 1 and 2, a method 100 is provided for receiving and segregating received inventory items and subsequently distributing the inventory items to a customer accessible portion or retail floor 12 of a retail facility 10. The method includes receiving 102 an inbound load 14 of inventory items from a warehouse facility (not shown). Receiving 102 may be performed manually by a human operator, such as by hand cart or a forklift, for example, or by a robotic operator, such as an autonomous mobile robot (AMR), for example. For purposes of this disclosure, modes and means of conveyance can be referred to as "conveyors", i.e. able to convey or transport items from one location to another. For example, the following may be considered conveyors for this disclosure, including, but not limited to, roller conveyors, belt conveyors, human operators (such as utilizing hand carts, pallet jacks, or forklifts), robotic operators (e.g. AMR or shuttles), The inbound load 14 is transported to the retail facility 10 via a transport vehicle 16 and receiving 102 includes selecting the subject load 14a from the vehicle 16 and transporting the load 14a into a rear, back, or non-retail portion 18 of the retail facility that is not accessible by retail customers. The items contained in the subject inbound load 14a that is retrieved at 102 are random or non-segregated (e.g. not optimized into family groupings). The warehouse facility that prepared and distributed the inbound load 14 utilizes a warehouse facility operating ecosystem 19 (FIG. 8) that may include a warehouse management system (WMS), warehouse control system (WCS), and warehouse execution system (WES), to track and maintain a record of the items that are packed into the load 14 and that load information or data is saved in a database 20. The warehouse facility may include a material handling and/or conveyance system, such as unit sortation system 17 (as illustrated in FIG. 8 and described in further detail below) having multiple warehouse workstations 21 that are adaptable for performing multi-functional or multi-operational processes, such as retail facility inventory order processing (i.e. typically large volume order processing) and/or individual customer e-commerce order processing (i.e. typically small volume order processing). The warehouse facility operating ecosystem 19 and an inventory management system 22 of the retail facility 10 are each in electronic communication with the database 20 and thus able to access the information in the database (FIG. 1). Accordingly, by accessing the database 20, the contents of each inbound load 14 is known/knowable by the inventory management system 22 at the retail facility 10. Each inbound load 14 is provided with a unique label or tag (applied or configured at the warehouse facility) that can be read by a sensor, camera, or scanner. The label information corresponds to the content information of the inbound load 14 stored in the database 20. It is contemplated that some amount or level of segregation may be performed along with the receiving function 102. For example, the individual inbound loads 14 may be partially segregated as they are offloaded from the vehicle 16 and loads 14 designated in one manner are transported to one destination within the back 18 of the retail facility 10 and loads 14 designated differently are transported to another destination.

The retail facility 10 includes an in-store putwall system in the form of a retail inventory segregation workstation 24 that includes a mobile inventory putwall or pick cart 26 (FIG. 1). The cart 26 includes a pick to light (PTL) system 28, a visual display system 30, and label scanner 32, each in communication with a computer 22a of the inventory management system 22. The computer 22a is programmed with computer code that is adapted to control the various components of the inventory management system 22, pick to light system 28, visual display system 30, and label scanner 32, in addition to others. The computer 22a may comprise one or more processors as well as hardware and software, including for performing the operations discussed herein. The PTL system 28 is operable to guide an operator to place inventory items from the subject inbound load 14a at appropriate locations on the cart 26. After the inbound load 14 is received at 102, the unopened subject inbound load 14a is assessed at 104, which includes scanning the label of the load 14a with the scanner 32 and sending the scanned label information to the computer 22a (FIG. 2). The computer 22a displays the contents of the unopened inbound load 14a on the display 30 to provide the operator a listing of goods which should be present in the load 14a (FIG. 2). An example mobile pick cart that may be utilized with the system is disclosed in commonly owned and assigned U.S. Pat. No. 11,001,445, issued May 11, 2021, the disclosure of which is hereby incorporated by reference herein in its entirety. An example PTL system that may be utilized with the system is disclosed in commonly owned and assigned U.S. patent application Ser. No. 17/889,942, filed Aug. 17, 2022, the disclosure of which is hereby incorporated by reference herein in its entirety. As illustrated in the exemplary embodiment of FIG. 1, more than one inventory segregation workstation 24 may be utilized in the back 18 of the retail facility 10. In other words, several mobile inventory carts may be utilized within a single retail facility as necessary or as desired to manage the volume of inbound and replenishment inventory of a particular facility. Different workstations 24 within the retail facility 10 may be assigned different family groupings of item types. As such, appropriate inbound loads 14 that are designated as including items from a particular family grouping are directed to a corresponding workstations 24 assigned to process that type of family grouping. It will be appreciated that a single inventory segregation workstation 24 may be appropriate and sufficient for a particular retail facility, such as a retail store with relatively small turnover. While the illustrative embodiment of FIG. 1 utilizes a mobile inventory putwall or pick cart 26, it will be appreciated that a stationary putwall may be utilized. For example, containers may be manually moved from the putwall to a cart to be transported to the retail floor by a human operator or an autonomous mobile robot may retrieve containers from the putwall and transport them to the retail floor. It will also be appreciated that the term operator as used throughout this disclosure may refer to either a human or a robot.

Once assessed at 104, the tote is opened and each inventory item in the inbound load 14a is selected individually by an operator and identified at 106 by scanning a label, tag, or other identifier type on the item with the scanner 32. It will be appreciated that additional identifier and sensor types, such as camera, infrared, RFID, etc., may be utilized to identify 106 the individual items. For example, an RFID enabled item-level material handling system and corresponding method may be utilized, such as that described and illustrated in commonly owned and assigned U.S. patent application Ser. No. 17/976,264, filed Oct. 28, 2022, the disclosure of which is hereby incorporated by reference herein in its entirety. Identifying 106 the item includes the computer 22a correlating the scanned identifier with the database 20 to determine the identity of the item. Once the item is identified at 106, the computer 22a directs 108 an operator to place the item at a particular location on the cart 26. The computer directs 108 the operator by illuminating a portion of the PTL system 28 and/or the display system 30 to indicate which portion of the cart 26 requires the item.

As an example, a cart 26 may include various shelves supporting various totes or containers 34 and a linear portion 36 of the PTL system 28 may represent each container 34. It is contemplated that an entire cart 26 (i.e. all containers 34 on the cart 26) may be assigned for processing a family grouping of inventory items, without any further granularity. It is also contemplated that while the cart 26 may be assigned for processing one family grouping (e.g. shoes), each of the containers 34 may be assigned or designated for different family sub-groupings. For example, a first container 34a on one shelf may be designated for men's dress shoes, a second container 34b on another shelf may be designated for women's athletic shoes, and a third container 34c on another shelf may be designated for children's sandals, etc. (FIG. 1). A first portion 36a of the PTL system 28 represents first container 34a, a second portion 36b represents second container 34b, and a third portion 36c represents third container 34c. If the operator retrieves a men's dress shoe item from the subject inbound load 14a and the item is identified at 106 as a men's dress shoe item, the computer 22*a* directs 108 the operator to place the item in the first container 34*a* by illuminating portion 36*a* of the PTL system 28. It will be appreciated that directing 108 the operator may be performed in many different manners. As described in U.S. patent application Ser. No. 17/889,942, the PTL system may provide an alphanumeric message to the operator via an alphanumeric display (e.g. the display may illuminate to display "MENDRS", indicating the men's dress shoe sub-family grouping). Additional examples include that an alphanumeric message may also be provided at the display 30, or a diagrammatic display may be provided at the display 30 to represent where the operator should place the item on the cart 26. Providing visual prompts or guidance to operators via the PTL system 28 and/or display 30 facilitates efficient sortation from overarching retail family groups (e.g. menswear, children's apparel, home goods, etc.), to the more granular or sub-family groupings that correspond to more defined or localized portions of a retail store. For example, a localized portion of a retail store may include a particular side of an aisle or a particular shelf on an aisle rack, as opposed to a general department. Such granularity improves store associate efficiency by limiting the possible locations they must consider when restocking inventory.

Based on the directions from the computer at 108, the operator segregates 110 the selected item to a corresponding family grouping at the indicated container 34 on the cart 26*a* (FIGS. 1 and 2). Wherein, the indicated container 34 is assigned to receive items of one particular retail family type, and the items contained in the indicated container 34 represent or define a segregated item grouping. The method 100 continues to identify each item at 106, and direct 108 the operator to segregate 110 each item from the subject inbound load 14*a* into the appropriate container 34 on the cart 26 (or carts). Receiving 102, assessing 104, identifying 106, directing 108, and segregating 110 may continue for additional inbound loads 14 until desired, such as when the containers 34 on a cart 26 have been filled or after all inbound loads 14 have been processed and segregated onto carts 26, for example. Once all items from the subject inbound load 14*a* (or additional desired loads 14) are identified and segregated onto the cart 26 (or carts), the method 100 includes distributing 112 the segregated item groupings to their respective departments, sections, or portions of the store via an operator transporting the cart 26 to the appropriate areas of the retail floor 12.

If, upon a first cycle of segregation via method steps 102 through 110, the items are segregated at a high level of granularity, such as each cart 26 containing items of one family grouping without any further segregation or granularity, it may be desired that the items on that cart 26 be further segregated into sub-family groupings. Accordingly, the method includes the optional function of reintroducing 114 the items on the subject cart 26 to the inventory segregation workstation 24 to be segregated to a finer level of granularity (FIGS. 1 and 2). The family segregated items on the subject cart 26 are reintroduced 114 at the identification function 106 at which point each item is retrieved from the cart 26 and scanned. The computer 22*a* then directs 108 the operator to segregate 110 the selected item to a corresponding sub-family grouping at a container 34 on a different cart 26. The containers 34 on the different cart 26 are each assigned for processing a particular sub-family grouping of items (e.g. women's boots). Once all of the family segregated items on the subject cart 26 have been processed and segregated to a sub-family grouping on a different cart 26, the method 100 includes distributing 116 the segregated sub-family item groupings to their respective departments, sections, or portions of the store via an operator transporting the cart 26 to the appropriate areas of the retail floor 12.

As the granularity of segregation (i.e. degree of sub-family grouping segregation) in the back 18 of the retail store 10 increases, efficiencies may be realized at the retail floor 12 by making it simpler for the stocking operator to determine where particular items on the cart 26 are to be stocked or displayed for customer access. The method 100 may also reduce the scope or physical dimensions of put-away that one operator must cover, for example, the operator may only need to putaway items along fifty (50) linear feet of shelving because all of the product on the cart 26 is optimally segregated to be putaway within that fifty (50) linear feet of shelving. As opposed to an operator attempting to restock shelves with a box of product that is not segregated or optimized, which may require the operator to move between several aisles and/or departments of the retail store to putaway all of the product in the box.

The inbound load 14 may include various inventory item profiles defining the uniformity of categorization or composition of the items within the load 14. For example, the inbound load may have one of the following inventory item profiles: (i) inventory items sourced from a known warehouse and having a non-segregated composition of inventory items that is not categorized by retail family type (see FIG. 2, as described above); (ii) inventory items sourced from an unknown warehouse and having a non-segregated composition of inventory items that is not categorized by retail family type (see FIG. 3, described in further detail below); (iii) inventory items sourced from a known warehouse and having a segregated composition of inventory items that is categorized by one or more item groupings of retail family types (see FIG. 4, described in further detail below); and (iv) inventory items sourced from a known warehouse and having a segregated composition of inventory items that is categorized by one or more item groupings of retail family types (see FIG. 5, described in further detail below).

It will be appreciated that functions of the method 100 may be omitted without substantially affecting the functionality and advantageous of the method. For example, inbound loads 14 may be received and segregated and then be placed in a short term warehouse area of the retail facility where they may be staged until such time as the items are required at the retail floor 12. In other words, the distribution functions 112 and/or 116 may be omitted and the segregated items (e.g. items in containers 34) may be held in the back 18 of the store 10 for future inventory replenishment and/or e-commerce order fulfilment processes.

Referring to the illustrative embodiment of FIG. 3, a method 200 is provided for receiving and segregating received inventory items and subsequently distributing the inventory items to a customer accessible portion of the retail floor 12 of a retail facility 10. Method 200 of FIG. 3 is substantially similar or identical to method 100 of FIG. 2 in many aspects, and includes many identical or substantially similar functions, with similarities briefly summarized and significant differences discussed in detail hereinafter. Like inbound loads 14 processed by method 100, the inbound loads 14 being processed in method 200 are not pre-segregated upon arrival at the retail facility 10 such that the items are random or non-segregated. However, method 200 differs from method 100 in that the inbound loads 14 being processed in method 200 are from an unknown warehouse source such that the inventory management system 22 does not have access to a database of load information from the source.

In particular, instead of assessing 104 and scanning a label on the unopened subject inbound load 14*a* (as performed in method 100), method 200 includes opening and performing 204 a preliminary visual inspection of the profile or composition of the items in the subject load 14*a* (FIG. 3). The inbound load 14*a* may be manually segregated, such as if the operator opening the load is able to make a determination as to what family grouping(s) the items inside belong to. For example, the operator may direct a subject inbound load 14 to an inventory segregation workstation 24 that is assigned for processing a family grouping that the operator determines is present in the subject load. Each inventory item in the inbound load 14 is selected individually by an operator and identified at 206 by scanning a label, tag, or other identifier type on the item with the scanner 32 (FIGS. 1 and 3). In similar fashion to the direction 108 of method 100 described above, the computer 22*a* directs 208 an operator to place the selected item at a particular location on the cart 26*a*. Likewise, the operator segregates 210 the selected item to the indicated container 34 on the cart 26*a*. Once all items from the subject inbound load 14*a* (or additional desired loads 14) are identified and segregated onto the cart 26*a* (or carts), method 200 includes distributing 212 the segregated item groupings to their respective departments, sections, or portions of the store via the cart 26*a*. If further granularity or segregation is desired, method 200 includes reintroducing 214 the family grouped items on the subject cart 26*a* to the inventory segregation workstation 24 to be further segregated. Once all of the family segregated items on the subject cart 26*a* have been re-processed and segregated to a sub-family grouping on a different cart 26, method 200 includes distributing 216 the segregated sub-family item groupings to their respective departments, sections, or portions of the store via the cart 26.

Referring to the illustrative embodiment of FIG. 4, a method 300 is provided for receiving and segregating received inventory items and subsequently distributing the inventory items to a customer accessible portion or retail floor 12 of a retail facility 10. Method 300 of FIG. 4 is substantially similar or identical to method 100 of FIG. 2 in many aspects, and includes many identical or substantially similar functions, with similarities briefly summarized and significant differences discussed in detail hereinafter. Like method 100, the inbound loads 14 being processed in method 300 are from a known warehouse source such that the inventory management system 22 has access to a database 20 of load information from the source. However, method 300 differs from method 100 in that the inbound loads 14 being processed in method 300 are pre-segregated into family groupings upon arrival at the retail facility 10. In other words, each of the inbound loads 14 have been at least partially segregated into homogenous family groupings of items.

In particular, the items in the subject inbound load 14*a* that is retrieved at 302 has been pre-segregated into one or more homogenous family groupings (FIG. 4). As such, since the source of the subject load 14*a* is known and the items have been pre-segregated, method 300 includes assessing the unopened load 14*a* at 304 and scanning the label of the load 14*a* with the scanner 32 and sending the scanned label information to the computer 22*a* (FIG. 4). The computer 22*a* displays the contents of the unopened inbound load 14*a* on the display 30 to provide the operator a listing of goods which should be present in the load 14*a* (FIG. 4). Steps 306 and 308 (FIG. 4) are performed in substantially similar or identical manner to steps 106 and 108 of method 100 as described above and illustrated in FIG. 2. Based on the directions 308 from the computer 22*a*, the operator segregates 310 the selected item to a corresponding sub-family grouping at the indicated container 34 on the cart 26*a* (FIGS. 1 and 4). Once all of the family segregated items from the subject inbound load 14*a* have been processed and segregated to a sub-family grouping on the cart 26*s*, the method 300 includes distributing 312 the segregated sub-family item groupings to their respective departments, sections, or portions of the store floor 12 via the cart 26*a*.

Referring to the illustrative embodiment of FIG. 5, a method 400 is provided for receiving and segregating received inventory items and subsequently distributing the inventory items to a customer accessible portion or retail floor 12 of a retail facility 10. Method 400 of FIG. 5 is substantially similar or identical to method 200 of FIG. 3 and method 300 of FIG. 4 in many aspects, and includes many identical or substantially similar functions, with similarities briefly summarized and significant differences discussed in detail hereinafter. Like method 300, the inbound loads 14 being processed in method 400 are pre-segregated into family groupings upon arrival at the retail facility 10. However, method 400 differs from method 300 in that the inbound loads 14 being processed in method 400 are from an unknown warehouse source such that the inventory management system 22 does not have access to a database of load information from the source.

As such, similar to method 200 at 204 as described above and illustrated in FIG. 3, method 400 includes opening and performing 404 a preliminary visual inspection of the profile or composition of the items in the subject load 14*a* (FIG. 5). The inbound load 14*a* may be manually segregated, such as if the operator opening the load is able to make a determination as to what family grouping(s) the items inside belong to. For example, the operator may direct a particular inbound load 14 to an inventory segregation workstation 24 that is assigned for processing a family grouping that the operator determines is present in the load. Each inventory item in the opened inbound load 14*a* is selected individually by an operator and identified at 406 by scanning a label, tag, or other identifier type on the item with the scanner 32 (FIGS. 1 and 5). The remaining functions of method 400, i.e. steps 408, 410, and 412 (FIG. 5) are performed in substantially similar or identical manner to steps 308, 310, and 312 of method 300 as described above and illustrated in FIG. 4.

Figure 6:
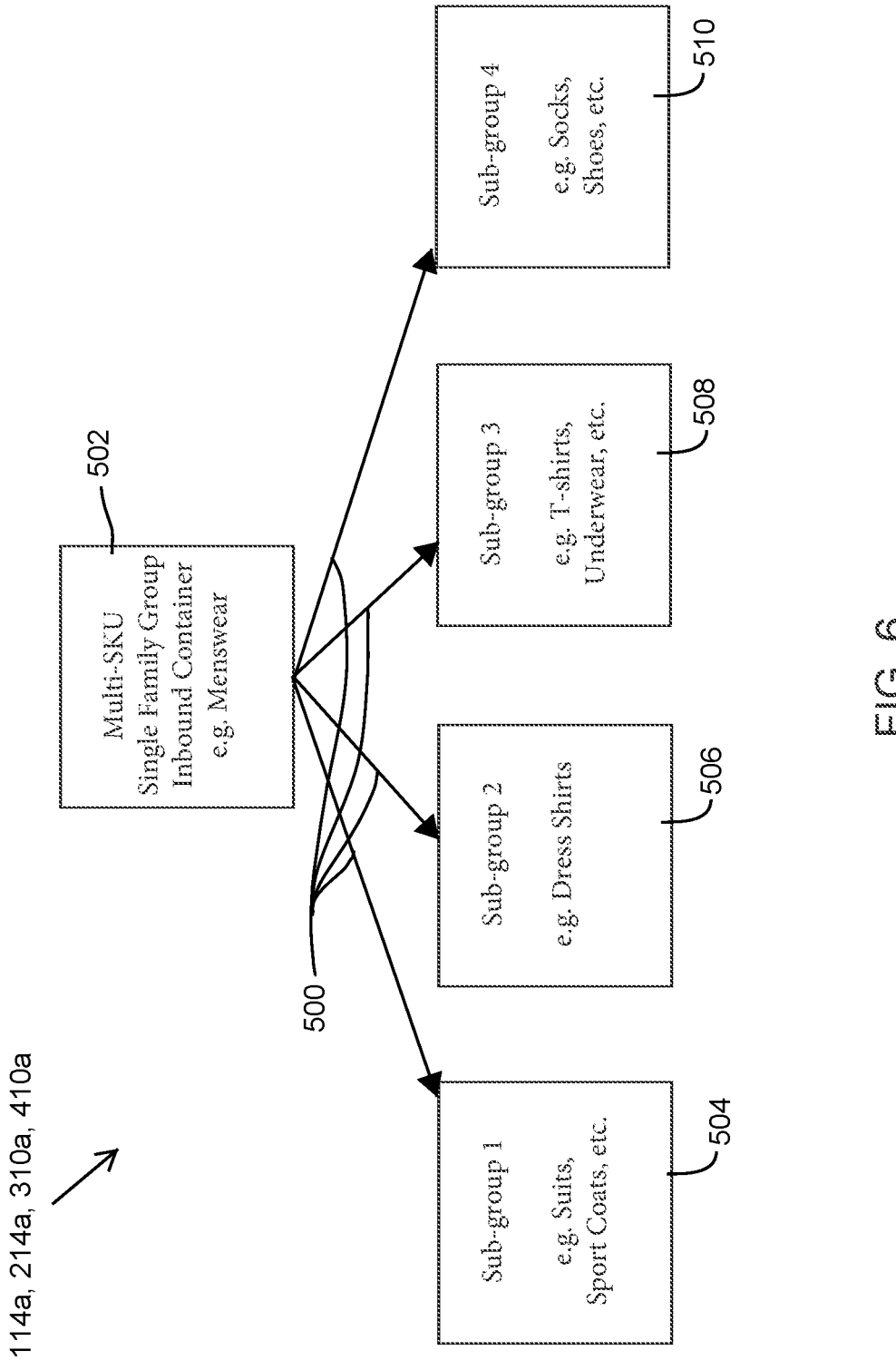
FIG. 6 is a diagram of a segregation portion of a method for inventory putaway within a retail facility which may be incorporated into the method diagramed in each of FIGS. 2-5.

Referring to the illustrative embodiment of FIG. 6, an exemplary embodiment of a method step 500 is provided for segregating inventory items of a particular family group into sub-family groupings of inventory items. The method step 500 may be incorporated into each of methods 100, 200, 300, and 400, such as at respective steps 114, 214, 310, and 410. Accordingly, when incorporated into the respective methods, method step 500 may be referred to as step 114*a*, 214*a*, 310*a*, and 410*a*, respectively. Method step 500 includes segregating items in a family grouping of multiple items, e.g. stock keeping units (SKUs) into a more granular set of sub-family groupings. For example, a multi-SKU family grouping of menswear 502 is further segregated into a first sub-group 504 of men's suits and sport coats, a second sub-group 506 of men's dress shirts, a third subgroup 508 of men's t-shirts and underwear, and a fourth sub-group 510 of men's socks and shoes.

Referring to the illustrative embodiment of FIG. 7, a method 600 is provided for performing e-commerce order fulfillment operations at a retail facility 10 utilizing an inventory segregation workstation 24. Method 600 is particularly well suited for fulfilling customer orders, which were placed online and will be picked up by the customer in store 10 or will be shipped directly to the customer from the store 10. The customer orders are fulfilled with inventory items present at the store 10, either in the back 18 portion or the customer accessible retail floor 12. Method 600 includes receiving 602 customer orders from a web host, application, or other order placement interface at which the customer placed their order (FIG. 7). The computer 22*a* and inventory management system 22 create 604 an operator guide workflow of order items to be retrieved from the retail floor 12 based on a pending order list stored at the computer 22*a*. The operator guide workflow provides an optimized picking path for the operator such that the operator is enabled to make a single pass through the retail floor 12 to retrieve the workflow items with minimal retracing or double-crossing of the retail floor 12. The workflow may be optimized for the retrieval of order items for multiple customer orders on a single pass through the store 10.

The operator traverses the retail floor 12 based on the optimized workflow to retrieve 606 the items indicated in the workflow (FIG. 7). To facilitate faster retrieval 606 of the workflow items, the operator may place the retrieved items into a cart, a tote, or other suitable transportable container in a batch manner, without any segregation, for example. It will be appreciated that while the inventory items required for an e-commerce order might all be present on the retail floor 12, it is also possible that some or all of the items for an e-commerce order might be present in the back 18 of the store 10. Thus, an operator may be required to retrieve those items from the back 18 of the store 10. The operator transports the retrieved items to the back 18 of the store 10 (i.e. a non-retail portion of the retail facility). The method 600 includes identifying 608 each item retrieved from the retail floor. Identifying 608 includes introducing the retrieved items to the inventory segregation workstation 24 and scanning a label, tag, or other identifier on each item with the scanner 32. Once an item is identified at 608, the computer 22*a* directs 610 an operator to place the item in an indicated order container (e.g. a shopping bag, a shipping carton, a tote, etc.) at a putwall of the inventory segregation workstation 24. The indicated container is assigned to the customer order requiring the selected item. The computer directs 610 the operator by illuminating a portion of a PTL system and/or a display system at the putwall to indicate which one of a set of order containers requires the selected item.

Based on the directions from the computer at 610, the operator segregates 612 the selected items to the indicated order container on the putwall. Once an order has been completed with all items required for that customer order and/or all items retrieved from the workflow have been placed in a corresponding order container, the method 600 includes either (i) packing, manifesting, and shipping 614 the order containers from the retail facility 10 to the respective customers and/or (ii) presenting the order containers at a customer pickup portion or area of the retail facility 10 (e.g. a customer service counter) for customers to retrieve at their leisure.

It is contemplated that retrieval 606, identification 608, directing 610, and segregating 612 items into discrete order containers may be combined into single function, which may be performed by the operator as they traverse the retail floor 12. For example, the operator may utilize a mobile inventory cart 26 to retrieve 606 the items from the retail floor 12. The operator may identify 608 each item by scanning it as it is selected from the retail floor 12 and the computer 22*a* may direct 610 the operator (with the PTL system 28 and/or display 30) to segregate 612 each retrieved item as it is retrieved. For example, the computer 22*a* may direct the operator to place a retrieved item into an order container that is supported on a shelf of the cart 26. Each order container supported on the cart is assigned to a particular customer order.

Referring now to the illustrative embodiment of FIG. 8, a material handling system is provided in the form of a conveyance and unit sortation system 17 configured to prepare orders for delivery to downstream customers, including retail stores (e.g. inventory replenishment orders) and individual customers (e.g. e-commerce orders). The sortation system may be disposed in a warehouse or distribution center. A warehouse facility operating ecosystem 19 controls the sortation system 17 and includes a computer 19*a* that is programmed with computer code that is adapted to control the various components of the warehouse facility, its operating ecosystem 19, and the sortation system 17. As noted above, the warehouse facility operating ecosystem 19 is in communication with the database 20. The computer 19*a* may comprise one or more processors as well as hardware and software, including for performing the operations discussed herein.

For example, Retailer A may operate multiple retail stores as well as an online or e-commerce storefront. Retailer A may supply inventory to each of its retail stores via a main warehouse facility or distribution center and may also fulfil and ship e-commerce orders from the main warehouse facility. By providing adaptable warehouse workstations and control systems, sortation system 17 may enable Retailer A to optimize warehouse space by enabling operators to perform either inventory replenishment order (i.e. retail order) fulfillment and/or e-commerce order fulfilment. The sortation system 17 includes multiple warehouse workstations or picking zones 21 at which an operator 15 picks items for orders.

The warehouse workstations 21 may include operator user interfaces that are controlled by the computer 19*a* of the warehouse facility operating ecosystem 19, and which may be utilized to guide the operator 15 for either type of order fulfilment, retail or e-commerce. By enabling either form of order fulfilment, the warehouse operation may be optimized based on demand for particular order types at any given time. For example, in the circumstance that Retailer A has shown a decline in instore purchases such that their inventory turnover is significantly lower than it was prior to the upsurge of e-commerce in recent years, while also showing a significant upsurge in e-commerce orders, then capacity of the warehouse to fulfil large item quantity inventory replenishment orders can be diverted to filling small item quantity e-commerce orders. Typically, inventory replenishment orders contain tens or hundreds of items (such as in a SKU pure manner) ordered by a particular retail store to replenish its inventory, whereas individual customer e-commerce orders typically container only above one to ten items or so. For another example, Retailer A may experience large short term surges in instore sales, such as during seasonal events, and a lower average of instore sales during the remainder of the year. As will be appreciated, the sortation system 17 enables the warehouse to readily handle either of these circumstances, as well as others.

Operators 15 at the workstations 21 retrieve warehoused items from warehouse storage receptacles or vendor cartons 38 that are transported through the warehouse on a carton conveyor 40 (FIG. 8), and place the picked or retrieved items to inbound load containers 14 (i.e. loads to be transported to be inducted at a retail facility) or to e-commerce order containers 42. A mix of inbound load containers 14 and e-commerce order containers 42 may be provided at the workstations 21 such that the picker 15 at a particular workstation 21 may pick both retail orders and e-commerce orders, substantially simultaneously, as depicted in the illustrative embodiment of FIG. 8. Alternatively, each workstation 21 may be dedicated to only one type of order picking, such that that particular workstation only has one type of container, either inbound order containers 14 or e-commerce order containers.

Figure 9A:
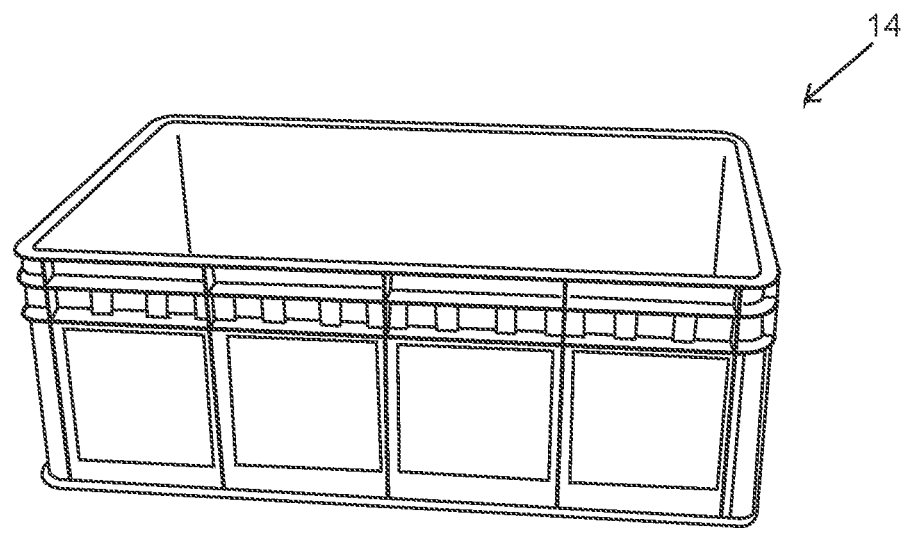
FIG. 9A is a perspective view of an order container.
Figure 9B:
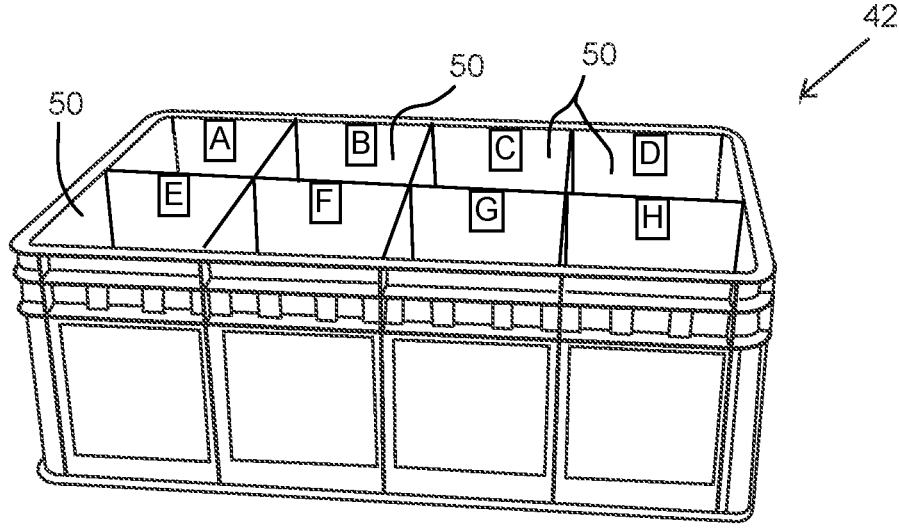
FIG. 9B is a perspective view of another order container, having a plurality of segregated compartments.

An outbound order conveyor system 44 is in transport communication with each of the picking zones 21 to receive completed order containers 14 and 42 and to transport them downstream, such as to a packing subsystem, packing table 46, or for transporting empty order containers 14 or 42 to the picking zones 21 to replenish order containers when they have been completed and transported downstream (FIG. 8). Completed e-commerce containers 42 may be segregated from completed retail, inbound order containers 14, such as on an e-commerce order handling system, such as a staging platform 48 to be held until transferred to a downstream packing station or to be transported along a conveyor to a downstream packing station, for example. At the downstream packing station, individual orders in individual compartments 50 of the e-commerce order containers 42 may be removed and packaged individually in a shipping carton (FIGS. 8 and 9B). Whereas completed inbound order containers 14 may be transported on the carton conveyor 40 and buffered at a loading buffer or zone 52, in which the containers 14 may be placed on a forklift 54 to be loaded onto a transport vehicle 16 (FIGS. 1 and 8). While the sortation system 17 is described and illustrated herein utilizing conveyors 40 and 44, it will be appreciated that other means and modes of transporting goods may be utilized within the system 17. For example, one or more robots may be utilized, such as a fleet of autonomous mobile robots (AMR). As noted above, for purposes of this disclosure, modes and means of conveyance can be referred to as "conveyors", including, but not limited to, roller conveyors, belt conveyors, human operators (such as utilizing hand carts, pallet jacks, or forklifts), robotic operators (e.g. AMR or shuttles), Referring now to the illustrative embodiments of FIGS. 9A and 9B, the order container 14 is provided for handling large item volume/quantity orders, such as retail inventory replenishment orders, and the compartmentalized order container 42 is provided for multiple small item volume/quantity orders, such as multiple, independent e-commerce orders. Order container 42 includes multiple compartments 50, which may be configurable in many combinations of compartment quantities and volumes, as desired or necessitated by the characteristics of items handled in the particular warehouse facility. The sortation system 17 may utilize a pick tracking or guidance system to direct an operator to which compartment 50 of a container 42 to place an item. An exemplary pick tracking or guidance system may be similar to the radio frequency identification (RFID) enabled verification system disclosed in the above mentioned U.S. patent application Ser. No. 17/976,264, for example.

Figure 10:
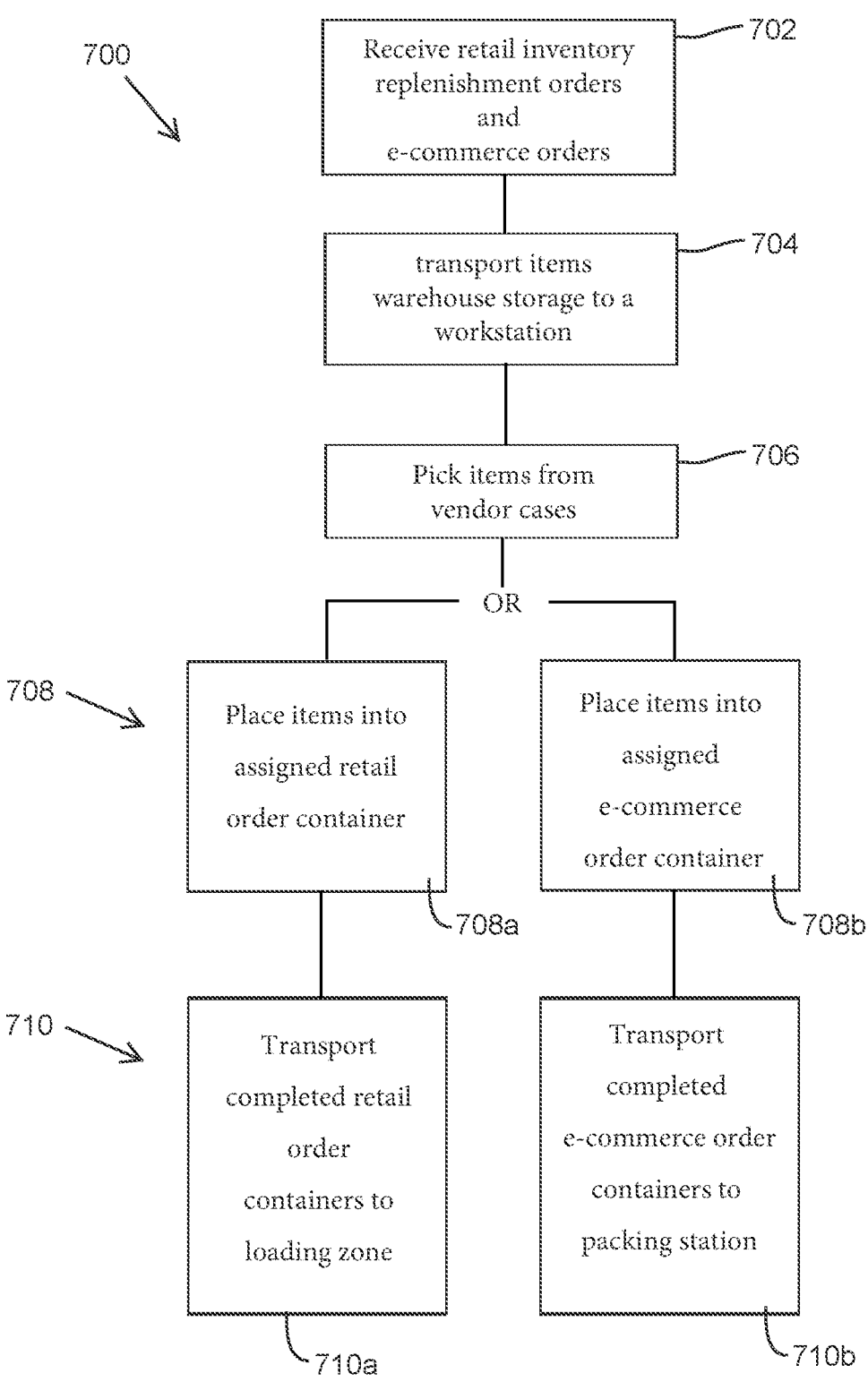
FIG. 10 is a diagram of a method for preparing retail orders and e-commerce orders simultaneously within a material handling system, in accordance with the present invention.

Referring now to FIG. 10, a method 700 is provided for preparing and filling order containers for various order types and destinations within a single material handling system of a warehouse facility, such as unit sortation system 17 described above and illustrated in FIG. 8. Method 700 is particularly well-suited for picking or preparing orders for retail inventory replenishment and individual customer e-commerce orders at substantially the same time or period, or in other words, simultaneously along with one another. In this manner, method 700 enables a sortation system 17 capable of fulfilling large quantity orders (such as SKU pure retail inventory replenishment orders having tens or hundreds of identical items) to be adapted or utilized to fulfil smaller quantity orders substantially simultaneous with or independent of large quantity order fulfilment processes (such as one to ten item e-commerce orders, for example.) For purposes of illustration, method 700 is described herein for preparing retail inventory replenishment orders and individual customer e-commerce orders simultaneously with one another within unit sortation system 17. The method of preparing orders 700 at the warehouse facility includes receiving 702, at the warehouse computer 19a, retail inventory replenishment orders from one or more retail facility and e-commerce orders from individual e-commerce customers. The computer 19a controls 704 the sortation system 17 to transport items from an upstream storage system (such as an automated storage and retrieval system, for example) to a workstation 21 of the unit sortation system 17 on a conveyor 40.

According to the order type being serviced by an operator 15 at a given moment, the operator 15 at the workstation 21 picks or retrieves 706 items from the conveyor 40, such as from vendor cases 38, and places 708 the picked them into appropriate order container of either a retail order container 14 for retail inventory replenishment orders or an e-commerce order container 42 configured to contain and support one or more e-commerce order. In other words, items picked at 706 for retail orders are placed 708a into an assigned retail order container 14, and items picked at 706 for e-commerce orders are placed 708b into an assigned e-commerce order container 42 Once a particular order container 14 or 42 is completed at the workstation 21, it is transported 710 to a downstream function or location. Completed retail order containers may be transported 710a to a retail order loading zone and completed e-commerce order containers may be transported to a downstream e-commerce handling system 48 and/or a packing station, for further processing.

Method 700 enables conventional retail store inventory replenishment warehouses or distribution centers to be adapted and/or reconfigured to process small quantity/volume e-commerce type orders, either independently, or alongside and simultaneously with retail inventory replenishment orders. Thus, a warehouse facility may be controlled or operated in manner providing for flexible workflow transitions between order types by enabling conventional store replenishment distribution and fulfillment to seamlessly accommodate e-commerce order fulfilment. Flexibility to handle both retail inventory replenishment and e-commerce may be facilitated by modifying existing software and product conveyance and routing infrastructure, and as such, these software and hardware modifications may be configured to allow seamless transition between retail replenishment and e-commerce order processing. For example, a system administrator (e.g. operator) may configure workstations 21 within the overall sortation system 17 to support e-commerce by selecting or pressing a hot button in the software user interface, and vice versa to return the workstation to handling replenishment orders. Adaptation and modifications to software, utilization of put-to-lights and their functionality and capabilities, and utilization of totes 42 with sub-divided compartments 50 (FIG. 9B), may enable a conventional retail replenishment warehouse to process much smaller orders to either increase store put-away efficiency (by providing smaller retail replenishment order loads) or facilitate e-commerce orders. Reconfiguring or providing reconfigurable totes 42, which may include reconfigurable compartments 50, enables existing order containers/totes 14 to be optimized in an efficient manner to create, segregate, and store multiple orders per tote (MOPT). Enabling MOPT may decrease overall tote traffic in the warehouse material handling system, including the unit sortation system 17. Further, efficient consolidation of MOPT may enhance shipping and packing operations by reducing tote lines in a completed order buffer at the packing station, or by more effectively guiding packing operators to retrieve items for a particular order to prepare them for packing and shipment. This arrangement may enable work-balancing optimization and functionality in pack-out operations.

As mentioned previously, the workstations 21 may also be configured to handle retail replenishment orders and e-commerce orders simultaneously, which may be facilitated with a hot button in the software user interface to enable such functionality. For embodiments in which e-commerce orders are processed, it is contemplated that e-commerce order totes or containers 42 will not be fulfilled or prepared in a SKU pure manner (as is often desirable for retail replenishment orders), but may contain a batch of items to complete a subset of e-commerce orders within the workstation 21. Likewise, for embodiments in which e-commerce orders are processed, it is contemplated that warehouse storage receptacles or vendor cartons 38 from the storage system may not be maintained or provided to the warehouse workstations 21 in a SKU pure manner, but may contain a batch of items to complete a subset of e-commerce orders within the workstation 21.

It will be appreciated that the aspects and embodiments described herein may be adapted or utilized to facilitate simultaneous operation of an omnichannel fulfillment system for various type of material handling tasks, including the exemplary retail replenishment and e-commerce order fulfillment functions described herein. An example of an omnichannel fulfillment system or unit sortation system may be similar in structure and function as that described and illustrated in commonly owned and assigned U.S. provisional patent application Ser. No. 63/312,945, filed Feb. 23, 2022, and entitled OMNICHANNEL SORTATION SYSTEM, the disclosure of which is hereby incorporated by reference herein in its entirety.

Thus, the illustrated embodiments provide methods for receiving, segregating, and distributing inbound inventory within a retail facility or store. The methods include receiving load of inbound inventory items in a non-retail portion of the retail store. The received loads may be received from a known source, i.e. a known warehouse, and the warehouse may share electronic information about the load with the retail store. The retail facility includes an inventory management system having a computer and a retail inventory item segregation workstation in the non-retail portion of the retail store. An operator, human or robot, unloads the items from an inbound load and identifies each item in the load. The computer directs the operator to segregate each item to a corresponding portion of a putwall, such as to one of several containers supported on a mobile inventory cart. Each item is segregated into a family grouping of inventory items that correspond to a particular department or area of the retail floor of the store. Once all items of an inbound load are segregated into appropriate family groupings, the family groupings are distributed to their respective department to be putaway by an associate on the retail floor. The inbound items may be further segregated into sub-family groupings to provide a more defined degree of granularity, thereby enabling the putaway associate's putaway task to be more efficient and/or simple. The methods may be adapted to process e-commerce orders for shipment out of the store or for in-store customer pickup.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method for receiving and segregating received inventory items, and distributing the inventory items to a customer accessible retail floor of a retail facility, said method comprising:

receiving, in a non-retail portion of the retail facility, a load containing a plurality of inventory items from a warehouse facility, wherein contents of the load of inventory items are known from the warehouse facility and stored in a database that is accessible at each of the warehouse facility and the retail facility;

assessing the contents of the received load; and wherein for each inventory item in the received load, said method comprising:

identifying a particular inventory item, wherein said identifying comprises:

electronically scanning an identifier on the particular item with a scanner useable by an operator; and correlating, with a retail computer, the scanned identifier with the database;

providing instructions by the retail computer to direct the handling by the operator of the particular item based on said correlating;

segregating the particular item based on the instructions from the retail computer to a corresponding portion of a put wall located in the non-retail portion of the retail facility, the corresponding portion containing a segregated item grouping defined by a particular retail family type of items encompassing the particular item;

moving the inventory items of the segregated item grouping from the non-retail portion of the retail facility to the customer accessible retail floor; and distributing the segregated item grouping to a corresponding portion of the customer accessible retail floor of the retail facility.

2. The method of claim 1, wherein the received load of inventory items comprises at least one inventory item profile chosen from (i) inventory items sourced from a known warehouse facility and having a non-segregated composition of inventory items that is not categorized by retail family type, (ii) inventory items sourced from a known warehouse facility and having a segregated composition of inventory items that is categorized by one or more item groupings of retail family types, (iii) inventory items sourced from an unknown warehouse facility and having a non-segregated composition of inventory items that is not categorized by retail family type, (iv) inventory items sourced from a known warehouse facility and having a segregated composition of inventory items that is categorized by one or more item groupings of retail family types.

3. The method of claim 1, wherein said segregating the inventory items comprises segregating the inventory items into item subgroupings defined by a subset of a particular retail family type.

4. The method of claim 1, wherein the put wall comprises a mobile inventory cart and said distributing the segregated item grouping comprises transporting the segregated item grouping to the retail floor on the mobile inventory cart.

5. The method of claim 1, wherein the put wall comprises a pick to light system in communication with the retail computer, wherein the retail computer is configured for controlling the pick to light system for guiding the operator to place inventory items at appropriate locations on the put wall.

6. The method of claim 1, further comprising preparing retail inventory replenishment orders and individual customer e-commerce orders simultaneously within a unit sortation system of a warehouse facility and having a warehouse computer, wherein said preparing orders comprises:

receiving, at the warehouse facility, a plurality of retail inventory replenishment orders from at least one retail facility and a plurality of e-commerce orders from at least one individual e-commerce customer;

controlling, with the warehouse computer, the unit sortation system to transport items from an upstream storage system to a warehouse workstation of the unit sortation system on a conveyor of the unit sortation system;

at the warehouse workstation picking items from the conveyor and placing them in at least one chosen from (i) a retail order container for retail inventory replenishment orders and (ii) an e-commerce order container configured to contain and support one or more e-commerce order;

transporting completed retail order containers as inventory loads to the non-retail portion of the retail facility; and transporting completed e-commerce order containers to a downstream e-commerce handling system for further processing.

7. The method of claim 6, wherein the warehouse workstation comprises a pick to light system in communication with the warehouse computer and configured to guide an operator at the warehouse workstation to place inventory items at appropriate ones of retail order containers and e-commerce order containers supported at the warehouse workstation.

8. A method for preparing retail inventory replenishment orders and individual customer e-commerce orders simultaneously in a warehouse facility, receiving and segregating received inventory items at a retail facility, and distributing the inventory items to a customer accessible retail floor of the retail facility, said method comprising:

receiving, at warehouse computer of the warehouse facility, a plurality of retail inventory replenishment orders from at least one retail facility and a plurality of e-commerce orders from at least one individual e-commerce customer;

controlling, with the warehouse computer, a unit sortation system to transport warehouse items on a conveyor from an upstream storage system to a warehouse workstation of the unit sortation system;

picking warehouse items from the conveyor and placing them to at least one chosen from a retail order container for retail inventory replenishment orders and an e-commerce order container configured to contain and support one or more e-commerce order;

transporting completed retail order containers as inventory loads from the warehouse facility to a non-retail portion of the retail facility;

transporting completed e-commerce order containers to a downstream e-commerce handling system for further processing;

receiving, in the non-retail portion of the retail facility, a received load of inventory items from the warehouse facility, wherein contents of the load of inventory items are known from the warehouse facility and stored in a database that is accessible at each of the warehouse facility and the retail facility;

at the retail facility segregating the inventory items from the received load to a put wall, wherein the inventory items are segregated and categorized into item groupings defined by a particular retail family type; and distributing the segregated item groupings to correlating portions of the customer accessible retail floor of the retail facility.

9. The method of claim 8, further comprising scanning an identifier on the received load with a scanning device, retrieving, with a retail computer at the retail facility, the contents of the received load from the database based on the scanned identifier, and communicating the contents of the received load to a retail operator to guide the segregation of inventory items.

10. The method of claim 9, wherein the put wall comprises a pick to light system in communication with the retail computer and configured to guide the retail operator to place inventory items at appropriate locations on the put wall.

11. The method of claim 8, wherein the conveyor comprises at least one chosen from a roller conveyor, a belt conveyor, and a robot.

12. The method of claim 8, wherein the load of inventory items comprises at least one inventory item profile chosen from (i) inventory items sourced from a known warehouse and having a non-segregated composition of inventory items that is not categorized by retail family type, (ii) inventory items sourced from a known warehouse and having a segregated composition of inventory items that is categorized by retail family type, (iii) inventory items sourced from an unknown warehouse and having a non-segregated composition of inventory items that is not categorized by retail family type, (iv) inventory items sourced from a known warehouse and having a segregated composition of inventory items that is categorized by retail family type.

13. The method of claim 8, wherein said segregating the inventory items comprises segregating the inventory items into item subgroupings defined by a subset of a particular retail family type.

14. The method of claim 8, wherein the put wall comprises a mobile inventory cart and said distributing the segregated item groupings comprises transporting the segregated item groupings to the retail floor on the mobile inventory cart.

15. The method of claim 8, wherein the warehouse workstation comprises a pick to light system in communication with the warehouse computer and configured to guide the operator at the warehouse workstation to place inventory items at appropriate ones of retail order containers and e-commerce order containers supported at the warehouse workstation.

16. A method of order fulfillment at a retail facility, said method comprising:

receiving electronic customer orders at an order fulfillment system for items within a retail facility, the order fulfillment system comprising a retail computer and a put wall located in a non-retail portion of the retail facility, wherein the customer orders are provided to the retail computer;

selecting multiple customer orders from a pending order list maintained in the retail computer and determining by the retail computer an optimal picking path to items required for the selected orders, wherein at least some of the items required for the selected orders are located within a customer accessible portion of the retail facility;

providing by the retail computer the optimal picking path to the items required for the selected orders;

following the optimal picking path provided by the retail computer and manually retrieving the required items from the customer accessible portion of the retail facility and transporting the retrieved items to the non-retail portion of the retail facility, wherein the items as retrieved by the operator are not segregated by the selected orders;

for each item retrieved, said method comprising:

scanning an identifier on a particular retrieved item; and manually segregating, based on instruction from the retail computer, the particular item to a corresponding one of a plurality of order containers at the put wall corresponding to the respective customer orders; and once all items retrieved are segregated into a corresponding one of the plurality of order containers, distributing the order containers to respective customers.

17. The method of claim 16, wherein said distributing the order containers comprises at least one chosen from (i) shipping the order containers from the retail facility to the respective customers and (ii) presenting the order containers at a customer pickup portion of the retail facility for customers to retrieve.

18. The method of claim 16, wherein the put wall comprises a pick to light system in communication with the retail computer and configured to guide the operator to place inventory items at appropriate locations on the put wall.

19. The method of claim 16, wherein at least some of the items required for the selected orders are located within the non-retail portion of the retail facility and said method further comprising manually retrieving the required items from the non-retail portion of the retail facility.

20. The method of claim 19, further comprising replenishing inventory items in the retail facility, said replenishing inventory items comprising:

receiving, in a non-retail portion of the retail facility, a load of inventory items from a warehouse facility, wherein contents of the load of inventory items are known from the warehouse facility and stored in a database that is accessible at each of the warehouse facility and the retail facility;

assessing the contents of the received load, and for each inventory item in the received load, said assessing comprising:

manually retrieving a particular inventory item from the received load scanning an identifier on the particular item; and correlating, with the retail computer, the scanned identifier with the database;

the operator segregating, based on instruction from the retail computer, the particular item to a corresponding portion of a put wall located in the non-retail portion of the retail facility, the corresponding portion containing a segregated item grouping defined by a particular retail family type of items; and distributing the segregated item grouping to a corresponding portion of the customer accessible portion of the retail facility.

*　*　*　*　*